United States Patent [19]

Gosset et al.

[11] Patent Number: 4,632,848

[45] Date of Patent: Dec. 30, 1986

[54] COMPOSITION AND PROCESS FOR FORMING A TEMPORARY PROTECTIVE COATING ON AN ARTICLE AND ARTICLE SO-PROTECTED

[75] Inventors: Serge Gosset, Lestrem; Jean-Claude Lumaret, Bethune; Francis Fortunato, Tourcoing; Michel Huchette, Merville, all of France

[73] Assignee: Roquette Freres, France

[21] Appl. No.: 700,071

[22] Filed: Feb. 11, 1985

Related U.S. Application Data

[60] Division of Ser. No. 620,381, Jun. 13, 1984, abandoned, which is a continuation of Ser. No. 389,756, Jun. 18, 1982, abandoned.

[30] Foreign Application Priority Data

Jun. 23, 1981 [FR] France .................... 81 12339

[51] Int. Cl.$^4$ .................... B05D 1/36; C09K 3/00
[52] U.S. Cl. .................... 427/154; 106/2; 106/213; 427/426
[58] Field of Search .................... 427/154, 426; 106/2, 106/212, 213; 134/38

[56] References Cited

U.S. PATENT DOCUMENTS

| | | | |
|---|---|---|---|
| 2,162,618 | 6/1939 | Izard | 91/63 |
| 2,249,205 | 7/1941 | Hansen | 427/426 |
| 2,916,376 | 12/1959 | Ritter et al. | 106/213 |
| 2,933,407 | 4/1960 | Witt et al. | 106/213 |
| 2,992,198 | 7/1961 | Funahashi | 106/213 |
| 2,999,030 | 9/1961 | Roederer et al. | 106/213 |
| 3,137,592 | 6/1964 | Protzmann et al. | 106/210 |
| 3,455,712 | 7/1969 | Webb | 106/212 |
| 3,476,575 | 11/1969 | Arnold | 106/2 |
| 3,955,985 | 5/1976 | Bosch et al. | 106/2 |
| 4,014,727 | 3/1977 | Musselman et al. | 106/213 |
| 4,021,260 | 5/1977 | Crill | 106/213 |
| 4,366,275 | 12/1982 | Silano | 106/213 |

FOREIGN PATENT DOCUMENTS

| | | |
|---|---|---|
| 45938 | 11/1972 | Japan .................... 106/213 |
| 707448 | 4/1954 | United Kingdom . |
| 1232279 | 5/1971 | United Kingdom . |
| 1306578 | 2/1973 | United Kingdom . |
| 1314605 | 4/1973 | United Kingdom . |
| 1318217 | 5/1973 | United Kingdom . |
| 1444498 | 7/1976 | United Kingdom . |
| 1456713 | 11/1976 | United Kingdom . |
| 1504128 | 3/1978 | United Kingdom . |
| 2391784 | 12/1978 | United Kingdom . |

*Primary Examiner*—Theodore Morris
*Attorney, Agent, or Firm*—Larson and Taylor

[57] ABSTRACT

Composition for forming on an article a temporary protective covering and applicable in the form of an aqueous solution or dispersion, comprising at least one starch or starch derivative and at least one wetting agent.

12 Claims, No Drawings

COMPOSITION AND PROCESS FOR FORMING A TEMPORARY PROTECTIVE COATING ON AN ARTICLE AND ARTICLE SO-PROTECTED

This application is a division of application Ser. No. 620,381 filed June 13, 1984 which is a continuation of application Ser. No. 389,756 filed June 18, 1982, both now abandoned.

The invention relates to a composition and a process for forming a temporary protective coating on an article.

It also relates to articles including such a coating.

It is already known, to protect temporarily the surface of items such as automobiles, piping, aluminum frames, molded articles and the like, to apply to them a protective coating, generally in the form of a film or pellicle which can be removed at the time of sale or just before use.

Protective coverings or coatings of the type concerned are intended to protect the articles tht they cover against blows or scratches which can occur during their packaging or during their various transfer and handling operations preceding sale, as well as against various climatic aggressions which can occur in the course of their storage. Thus, for example, may be mentioned the case of automobile vehicles, which are sometimes stored in the ports or which are transported by rail or sea and which may be subject, for this reason, to very varied climatic conditions, or which can undergo various projections of dust, of salt or of sand, capable of damaging their bodies and even of giving rise to corrosion of various parts.

Obviously all manufactured articles do not require the same protection. It is easily understood, in fact, that the protection required for an automobile which will be stored outside during periods which can amount to several weeks, or even several months, will be more rigorous than the protection required for a metal implement which will be stored in a warehouse.

Certain minimum requirements are however necessary whatever the type of porection envisaged or whatever the substrate to be protected. The protective coating must thus offer at least the following qualities, in particular:
- be easy to apply,
- have an adherence to the constituent material of the article to be protected which is sufficient for the coating not to be removed or damaged in the course of the various operations of shipment or of storage.
- be the most inoffensive possible with respect to the constant material of the article to be protected, of which it must not provoke a degradation reaction,
- show good resistance to moisture,
- be as easy and rapid to remove as possible.

In addition to these minimum properties, it is sought, for the protection of certain articles, to have additional characteristics, among which may be mentioned:
- transparency of the protective film,
- resistance of the coating with respect to water (the case for example of bad weather),
- resistance to saline fog or salty spray,
- resistance toultra-violet radiation.

These additional characteristics may become necessary to ensure protection of articles which have to be stored outside; a typical case is constituted by the temporary protection of automobile vehicles.

Products are already known which permit the formation of temporary protective coatings. They are essentially paraffins, waxes or emulsions. These products, put into the form of solutions or of dispersions, may be applied to the materials to be protected in various ways, mostly by dipping or by spraying, possibly electrostatic. They have however several major drawbacks which, in the course of the years, are less and less acceptable.

One of these drawbacks resides in the fact that the solubilisation or dispersion of the products which have to constitute the coating necessitates mostly the presence of a solvent, either of the aliphatic hydrocarbon type such a white spirit, or of the alcohol type such as isobutyl alcohol. Now, these solvents improve precautions in use at the time of the application of the product, by reason of their inflamability and their relative toxicity. In addition, these solvents are not inoffensive with respect to certain materials such as, for example, rubber, acrylic or polycarbonate resins and synthetic plastic materials which enter into the constitution of a large proportion of the articles which have to be protected.

Another drawback resides in the difficulties encountered at the time of removing the protective covering, also called unwrapping, which necessitates, in fact, recourse either to solvents, or to hot slightly alkaline solutions supplemented with surface active agents, or to a combination of these means.

Special equipment is even sometimes indispensable to carry out this unpackaging operation. Such equipment, through its cost and bulk, is only to be found at certain points distributed geographically in the sales areas.

Another drawback resides in the non-biodegradability of the various products at present used, the latter thus being the cause of pollution not only at the place of application of the coating, but again at the places of unwrapping.

Another drawback resides in the fact that certain of the products used until now, namely parafins and waxes, do not permit perfectly transparent films to be obtained, which is inconvenient in certain applications where transparency is desired either to flatter the visual appearance, or to permit visibility through the windshield of cars, or to recognize the color of the constituent material of the protected articles.

It is a particular object of the invention to overcome these drawbacks and to provide a composition and a process of the type concerned not requiring recourse to a solvent of the aliphatic hydrocarbon type or of the alcohol type and permitting the obtaining of the coating which is essentially biodegradable and easily removed.

Now, Applicants have had the merit of finding that a coating obtained from a composition which can be applied in the form of an aqueous solution or dispersion and which is based on at least one starch or starch derivative and at least one agent, denoted below by the expression "wetting agent", that is to say adapted to lower the surface tension between the aqueous solution and the surface of the article intended to receive the coating, meets these requirements.

The one or more starches or starch derivatives as well as the one or more wetting agents reoccur in the abovementioned coating.

By "starch", is meant products selected from the group comprising native starches of any origin, natural or hybrid, derived, for example, from potatoes, manioc, corn, waxy corn, corn with high amylose content, wheat, or rice. By "derivatives of starch" is meant any starch modified physically and/or chemically with the exclusion of dextrins which, through their constitution, do not withstand moisture and which cannot be made moisture resistant. The modifications obtained physically which can be carried out on starch comprise in particular the operations of gelatinization on a drum and cooking-extrusion or heat-extrusion treatments. By chemically obtained modifications, is meant the operations or reactions of oxidation, of fluidification (acid or enzymatic), bursting with soda, esterification, etherification and cross-linking.

The "wetting agents" which can be applied are selected from the group comprising, in particular, anionic, cationic, non-ionic or amphoteric surfactant products, among which may be mentioned soaps, sulfonates and sulfates, hydrochlorides of laurylamine, quaternary ammonium halides, pyridinium alcohol bromides, ethylene oxide or propylene oxide condensates with fatty acids, fatty alcohols, amines or phenols and the like.

The presence of at least one wetting or surfactive agent in the composition according to the invention is made necessary by the fact that the protective coating sought must be distributed homogeneously and continuously over the whole surface of the constituent material of the article to be protected.

It is the production of such a continuous and homogeneous coating which imposes the value of the minimum amount of starch or starch derivatives and wetting agents which must be present in the solution or dispersion in the form of which the composition according to the invention is applied.

With respect to the dry matter content of the composition, the wetting agent is present in a proportion ranging from 0.05 to 10% by weight, preferably from 0.08 to 7.5%.

Preferably, the composition according to the invention includes also at least one plasticizing agent.

The latter may be selected from the group comprising, for example, sorbitol, glycerine, hydrogenated glucose syrups, lactates, gluconates, polyethylene and polypropylene glycols and their condensates, urea, thioureas, nitrates and their mixtures.

The proportion of plasticizing agent is from 0.5 to 30% by weight, preferably from 1 to 25% by weight with respect to the dry matter content of the composition and, more preferably again, from 2 to 20%.

The presence of the plasticizing agent is desirable, in order to obtain a stable protective coating, not having a tendency to scaling or to the formation of cracking in the source of storage.

The composition according to the invention so-constituted, that is to say comprising a starch or starch derivative, a wetting agent and, preferably, a plasticizing agent is easily soluble in water and may advantageously be used to form coatings intended for the temporary protection of manufactured articles stored in atmospheres of slight or average humidity.

The protective coatings so-obtained are not however suitable for the temporary protection of articles capable of being subjected to a relatively moist environment, and all the less so for articles which have to be stored outside.

The compositions according to the invention-producing coatings which respond to the latter requirements comprise at least one agent adapted to confer on the said final coating, water-resistant properties.

Among these agents, may be mentioned, for example, insolubilizing resins of the ketone-formol, urea-formol, urea-keton-formol, melamine-formol, cyanamide or cyanamide-formol salt, resorcinol-formol, phenol-formaldehyde types or various insolubilizing or cross-linking agents such as aluminium sulfate, bifunctional reagents such as for example, glyoxal, and the like.

The proportion by weight of insolubilizing agent present in the composition adapted to form the projective coating is from 1% to 40%, preferably from 2 to 35% and, more preferably still, from 3 to 30% by weight with respect to the dry matter content.

To further improve the resistance to water and to inclement weather of the coating of which it permits the formation (particularly when the latter is intended for protection of automobile vehicles subject to the trickling of rain), the composition according to the invention comprises a water-repellent agent. The latter may be selected from the group comprising especially:
  potassium siliconate,
  anionic aqueous solutions of the ammonium salt of a copolymer with a carboxyl group,
  weakly cationic aqueous emulsions of modified fatty alkyl diketene,
  paraffin emulsions containing an eluminium salt and fluorinated bases, zirconium salts.

This water-repellent agent is present in a proportion of 0.1 to 10%, preferably from 0.2 to 8% by weight with respect to the dry matter content of the composition.

Recourse is had to the water-repellent agent due to the fact that, while it is true that the insolubilizing agents hinder the removal of the protective coating in contact with water or moisture, they do not generally permit a fully satisfactory hydrophobic character to be obtained, which may sometimes result in local swelling of the coating, this swelling causing weakening of the coating and resulting in its degradation on friction.

The protective coatings obtained by applying the compositions according to the invention include the constituents of the latter.

The composition according to the invention may possibly include other constituents such as, for example:
  acids or alkaline agents to adjust the pH of the mixture to a certain value (and regulate the insolubilization speed, that is to say the reaction of the resin), this value being selected mostly between 2 and 12, preferably between 3 and 10 and, more preferably still, between 3.5 and 9,
  texture modifying agents, like dibenzylidene sorbitol, calcium stearate, borax, aluminium sulfate, aluminium chloride; the addition of these agents to starch or starch derivatives solutions generally results in a sudden increase in viscosity, so that it is possible to obtain in this way a "trapping" of the water, the coating obtained thus having apparently a pronounced dryness;
  catalysts of the insolubilization reactions like ammonium chloride,
  anti-rust agents, such as, for example, calcium sulfonate, sulfate, chromates,
  U.V. light-absorbing agents, anti-oxidants, bactericides or antifungal agents.

According to a particular aspect of the invention, the above-mentioned composition may comprise a proportion of from 0.1 to 49, preferably from 1 to 25% (by weight with respect to the dry matter content of the composition) of a synthetic binder which may be selected from the group comprising the latexes, the acrylic resins in solution or in emulsion, the polyvinyl acetates and the vinylic resins, the said binder enabling to modify the cohesion and the rigidity of the protective coating or film as obtained.

The process according to the invention for forming the temporary protective coating is characterized by the fact that in successive steps the composition according to the invention is applied in the form of an aqueous solution or dispersion, by brush, by spray-gun or by dipping, after which the water is evaporated by natural or forced drying.

Although, not indispensable and unsought, a small proportion of organic solvents in the composition according to the invention, may show itself to be advantgeous in certain cases, for example, to solubilize certain adjuvants which are soluble with difficulty in water; in the same spirit, it may be advantageous but not necessary to add such solvents to accelerate, in certain cases, the drying speed of the protective coating after the application of the composition.

The aqueous solution or dispersion by means of which the composition according to the invention is applied, has a concentration of dry matter comprised between 3 and 70%, preverably between 5 and 60% and, more preferably still, between 5 and 55% by weight. This concentration is selected particularly, on the one hand, as a function of the type of application adopted which conditions the maximum admissible viscosity and, on the other hand, as a function of the temperature of the solution or of the dispersion at the moment of its application.

The solution or dispersion by means of which the composition according to the invention is applied, contains preferably, according to a first possibility, besides the solubilized starch, all the other constituents of the composition. This possibility is particularly interesting for applications by dipping. This solution must exibit high stability over time, which is all the more difficult to realize as the starches used are more subject to retrogradation or especially as the presence of insolubilizing agents causes the viscosity of the preparation to vary rapidly.

A second possibility enabling these drawbacks due to lack of stability to be eliminated, consists of forming the mixture of the starch solution with the various reagents capable of causing rapid variation of viscosity only at the last minute. This could be done, for example, in a device of the duel feed gun type, one input being reserved for the preparation containing the starch, the wetting and/or plasticizing agents and other possible adjuvants, the second input being reserved for the texture-modifying agents and/or the insolubilizing agents. This type of processing enables in particular the use of any starch, even native starch. By way of example, it is possible to produce a nature starch/glue at a concentration of about 20 to 40% of dry matter, by enzymatic or oxidizing liquefaction, (which enables adjustment of viscosity to the desired level by the choice of the amount of enzyme or of oxidizing agent applied), then add thereto the wetting and/or plasticizing agents as well as the different adjuvants possibly desired, and then conduct the preparation so-obtained through one of the inputs of the applicator gun, whilst through the second input is introduced simultaneously an insolubilizing resin of the urea-formol type.

Nonetheless, as indicated above, it is preferred to have a protective coating solution which comprises all the desired components, which is hence usable as such by the user and which remains stable over time (that is to say which has a stability of at least 48 hours) in spite of the presence of insolubilizing agents and/or texture modifying agents. Such a solution is applicable to all materials, including here those which are subject to climatic aggression.

This stability condition is extremely difficult to realize when combinations of starches and of insolubilizing agents are used, by reason, on the one hand, of the well-known very reversionary nature (tendency towards retrogradation) of amylaceous products and by reason, on the other hand, of their high reactivity with respect to insolubilizing resins.

Now, Applicants have found that the solution in the form of which the composition according to the invention is applied, responds to this stability requirement as soon as the agent of starchy nature that it comprises is constituted by a chemically modified starch, preferably modified by esterification or by etherification, or by a waxy starch, preferably corn starch, preferably modified by cooking extrusion, and as soon as the pH of the solution is fixed at a value situated outside of the optimal pH zone of the reaction of the insolubilizing resin on the starch.

It follows that, if an insulubilizing resin of the urea-formol type is used, which is known to react with the agents of starchy nature at pH's of average acidity, the pH of the solution is fixed, for example, at a value situated within the range of alkaline pH's, preferably at a value higher than 8.

On the other hand, if one choses to use an insolubilizing resin of the resorcinol-formol type, which is known to react with starch at alkaline pH's, the pH of the solution is fixed, for example, at an cid value, preferably at a value comprised between 4 and 5.5.

The choice of the amylaceous agent among the above defined starches, and the fixing of the pH of the solution outside of the optimal zone of reaction of the insolubilizing resin on the starch, enables the obtaining of a solution ready for use which comprises the starch, the wetting agent, if necessary the plasticizing agent and other adjuvants, as well as the insolubilizing resin and which is perfectly stable, that is to say, it does not have notable variation of viscosity during a period at least equal to 48 hours.

Applicants have observed, that surprisingly, in spite of the choice of pH outside of the zone corresponding to optimal reaction conditions of the insolubilizing resin on the agent of starchy nature, the protective coating obtained, by application of the solution and then natural or forced drying, had a quite satisfactory water resistance.

Thus, it is possible to provide users, in accordance with the invention, with a composition which can be applied in the form of a stable aqueous solution ready for use and which enables production of a biodegradable protective coating, having good adherence, good impact and scratch resistance as well as good resistance to inclement weather.

When it is desired to produce a temporary protection of painted metal articles—this is the case of automobile vehicles, for example—it is preferable to use a protective coating solution whose pH is slightly acid, that is to say preferably comprised between 4 and 6. It is then preferred to use, as the insolubilizing resin, a resin of the type of those which have an optimal reaction pH zone with the starch situated in alkaline pH's, such as for example, resorcinol-formol or cyanamide-formol.

A preferred composition according to the invention, leading to a solution stable over time, comprises an extruded waxy starch which is solubilized in water with stirring, a wetting agent, an insolubilizing agent and if necessary a plasticizing agent, as well as a water repellent agent and if necessary other adjuvants. The insolubilizing agent is preferably constituted by resorcinol-formol or cyanamide-formol and the water repellent agent by potassium siliconate.

The pH of the solution in the form of which the composition is applied, is selected to be less than b 7, preferable between 4 and 5.5.

The preferred composition according to the invention comprises, the percentages being comprised by weight on dry matter of the total mixture:
- from 30 to 95% of an extruded waxy starch,
- from 0.5 to 5% of a wetting agent, preferably constituted by a non-ionic surface active agent,
- from 1 to 25% of a plasticizing agent, preferably constituted by sorbitol, glycerine, or a polyethyleneglycol,
- from 2 to 30% of an insolubilizing agent, constituted preferably by resorcinol-formol or cyanamide-formol,
- from 0.2 to 6% of a water-repellent agent constituted preferably by potassium siliconate.

The other constituents possibly present are in a proportion not exceeding 8% of the total mixture with respect to dry matter. Among these constituents, may be mentioned, for example, preserving agents, anti-rust agents, ultraviolet light absorbing agents, catalysts of insolubilization reactions like ammonium chloride, as well as other, as already indicated above.

From the practical point of view, the starch from waxy corn is solubilized in water, then the various components mentioned above are added and the pH is immediately adjusted between 4 and 5.5, by the addition of an acid such as acetic acid. The content of dry matter of the solution so obtained is selected between 3 and 35%, preferably between 5 and 30% and, more preferably again, between 7 and 25%.

This solution is stable over time, that is to say it does not show any notable change in viscosity during a period of at least 48 hours. It results from the examples given below that solutions based on extruded waxy corn have been stockable over periods longer than 10 days without showing a notable chnge in viscosity.

The stable solutions ready for use so obtained and in the form of which the composition according to the invention is applied, may be utilized on articles to be protected by spraying or by dipping. The spraying is preferably electrostatic. The protective covering obtained is homogeneous, transparent, does not flake, nor swell over time, is insensitive to scratches and is not removed beneath the trickling of rain.

The removal of this coating is easily effected by brushing with water, if necessary supplemented with one or several amylolytic enzymes and/or one or several surfaces active agents and/or in a slightly alkaline medium of pH from 7 to 9.

Consequently another object of the invention is a process to remove the coating from surfaces protected as above described.

According to this process, the said protected surfaces are brushed with water which possibly contain one or several amylolytic enzymes and/or one or several surface active agents and/or an alcaline agent in an amount sufficient to bring the pH to a value of the range of 7 to 9.

The invention will be better understood with the aid of the examples indicated below, and which relate to advantageous embodiments.

EXAMPLE 1

Composition for the production of a temporary protective coating on aluminium parts intended to be stored sheltered from inclement weather, this composition resulting in a solution having good stability over time.

This composition is on the basis:
- of a wetting agent,
- of a plasticizing agent,
- of a starch derivative.

The wetting agent used is a non-ionic surface active product; in the event, it was that marketed by Ugine-Kuhlmann under the trademark "UKANIL 64".

The plasticizing agent is constituted by 70% sorbitol syrup; in the event, it was that marketed under the trademark "NEOSORB 70/70" by Applicant Company.

In order to render the coating solution stable over time, so called "stabilized" derivatives of starch are used, that is to say, generally chemically modified, either by esterification, or by etherification.

In the present example, recourse was thus had to a potato starch esterified with acetic anhydride and having an acetyl index close to 1.5. This acetylated starch was also subjected to a fluidification process by acid hydrolysis, in order to adjust the viscosity in solution to a suitable value.

The solution for the protective coating was prepared by dispersing, in a one liter beaker containing 300 cm$^3$ of water, an amount of 65 g of the abovesaid fluidized acetylated starch; in the event, recourse was had to that known under the name "KOFILM 150" marketed by Applicant Company. Solubilization was obtained by cooking with live steam for a period of about 10 minutes with stirring by means of the Micro-Vortex device rotating at a speed of about 500 rpm.

After cooling the solution so obtained to room temperature, successively, 13 g of the plasticizing agent and 0.75 g of the surface active agent were added.

The dry matter content was then brought by the addition of water to a value in the neighborhood of 13%. The viscosity obtained was 56 seconds by the Ford cup No. 4 (at 25° C.) and 200 cps by the Brookfield viscosimeter (at 25° C.).

Three parts of aluminium were then immersed in the protective coating solution so obtained. The deposit was approximately 100 g/m$^2$ wet. The covering was dry after a period of 15 minutes at ambient temperature.

The coating obtained was perfectly adherent to the support, withstood impact, did not flake in time and was perfectly transparent.

The protective coating solution did not show notable change in viscosity over a period of three weeks and can hence be manufactured in advance and dispatched to the place of use.

EXAMPLE 2

Composition for producing a temporary protective coating on metal implements which have to undergo prolonged storage in outside storage sites.

For this purpose, it is convenient to render the covering resistant to bad weather by resorting to a resin, for example to a precondensate of the urea-formol type which, reacting with the starch derivative, results in the insolubilization of the latter.

Apart from this precondensate, the composition is prepared by resorting to startch derivatives, to the plasticizing agent and to the wetting agent of Example 1.

In a one liter beaker, are therefore dispersed 65 g of the acetylated fluidized starch known by the name of "KOFILM 150" in 300 cm$^3$ of water. The solubilization of this product is obtained by cooking with live steam for 10 minutes with stiring by a Micro-Vortex retaining at a speed of about 500 rpm.

After cooling the solution, there are successively added 13 g of a solution of plasticizing agent and 0.75 g of wetting agent according to Example 2.

By dilution in water, the final content of dry matter is brought to about 13%, which gives a viscosity of 56 seconds with the Ford cup 4 No. 4 (at 25° C.) or again 200 cps in Brookfield viscosity (at 25° C.).

The pH of the thus constituted solution is 5.5.

Due to the fact of the great reactivity in this pH zone of the insolubilizing precondensate, the latter is only added to the solution at the moment of use. The urea-formol precondensate used is that marketed by the Sandoz Company under the name "FINISH EN".

The amount of "FINISH EN" applied is 10% by weight with respect to the weight of fluidized acetylated starch.

For producing the protective coating on the metal implements to be protected, recourse is had to a dual channel electrostatic gun, one channel introducing the precondensate and the other the three other constituents, the mixture occurring at the outlet of the gun. A deposition of 100 g/m$^2$ "wet" is carried out. The protective covering so obtained dries in a few minutes and offers excellent water resistance. Moreover, its transparency is only very slightly attenuated by cross-linking. Its resistence to impact and to scratching is very satisfactory. Removal of the covering can be effected by means of an alkaline enzyme solution, containing 0.05% of α-amylase, for example that known under the trademark "THERMAMYL" marketed by the NOVO Company and brought to a pH 8 by means of sodium carbonate.

For storage, recourse is had to separate containers or wrappings for the precondensate, on the one hand, and the composition of the three other constituents, on the other hand.

EXAMPLE 3

Composition for producing a temporary protective covering resistant to bad weather and which can be put into the form of a ready-for-use solution having good stability.

The composition is made up by resorting to the same starch derivative as in the preceding example and, as wetting agent, to sodium dibutyl sulfosuccinate, actually the product marketed under the name "EMPIMIN OT" by the MARCHON company.

From the starch entering into the above-said composition, is prepared 1 liter of solution having a content of 10% of dry matter, by dispersion, then cooking with live steam for 10 minutes, with stirring obtained by means of a Micro-Vortex rotating at 500 rpm.

After cooling, there is added to this solution:
1.8 g of the abovesaid wetting agent,
20 g of plasticizing agent constituted by "NEOSORB 70/70",
15 g of acid cyanamide,
15 g of formol in the form of 35% solution,
10 g of 40% potassium siliconate.

The pH of the solution is then brought back immediately from 9.6 to about 4.5, by the addition of acetic acid.

The solution was then adjusted, by the addition of water to a Brookfield viscosity of 43 cps at 20° C., namely about 19 seconds at 20° C. by the no. 4 Ford cup.

The solution thus ready-for-use may be stored without notable change in viscosity for more than 76 hours. It can be applied to painted metal articles by means of a pneumatic gun.

After drying in the ambient air for about 20 minutes, the protective film obtained was fully resistant to water. In fact, an exposure of 8 hours under a tap did not modify its appearance in any way.

EXAMPLE 4

Composition for producing a temporary protective covering, resistant to bad weather, easy to remove and having excellent preservability in ready-for-use state and before application.

Such composition is required for the temporary protection of vehicles emerging from the production line and frequently stored in the open air, hence exposed to inclement weather for weeks, or even months.

The contemplated composition enables the production of a coating which is
transparent,
adherent,
resistant to scratches, impacts and to bad weather, and can be put into the form of an aqueous solution stockable in ready-for-use form for a prolonged period.

This composition is based on a waxy corn starch which has been extruded by means of a dual screw extruder, so as to obtain a viscosity of about 1000 cps measured with the Brookfield viscosimeter (spindle 2 and 50 rpm) at 20° C. and with 25% of commercial dry matter.

Besides the extruded waxy corn, the composition for the coating comprises:
wetting and plasticizing agents according to Example 1,
an agent adapted to confer on the composition properties of moisture resistance, this agent being constituted by acid cyanamide and formol and
a water-repellent agent constituted by potassium siliconate.

To prepare the aqueous solution for a coating, procedure is as follows.

Starting from the above-mentioned extruded waxy corn thus rendered cold soluble, 5 liters of a solution having a content of 10% dry matter were prepared.

This solution was stirred for 30 minutes by means of a device of the Micro-Vortex type rotating at the speed of about 1500 rpm.

Five minutes before the end of this stirring, there were added:
10 g of wetting agent,
100 g of plasticizing agent,
75 g of acid cyanamide,
75 g of formol in the form of a 35% solution,
50 g of a 40% potassium siliconate solution.

The pH of the composition was then in the vicinity of 9.5. To buffer the pH of the composition to a value situated in the vicinity of 4.5, acetic acid was added.

The protective coating solution was then ready for use. It can be applied to vehicles by means of an electrostatic gun. For this, the viscosity is adjusted to 27 seconds at 20° C. on Ford cup no. 4 or again to 105 cps at 20° C. on the Brookfield viscosimeter, by diluting with the necessary-amount of water.

A deposit of 200 g/m$^2$ wet on the whole of the vehicle was effected.

Drying was achieved by passage in an infra-red tunnel.

The protective coating was perfectly dry in one minute.

The protective coating responds to all the requirements of the technique, notably from the point of view of resistance to bad weather, to impact and to scratches.

It is in addition of great transparency, which is a considerble advantage for this type of application (notably as regards facility for the manipulation of the venhicles and for marking colors).

However the essential particularity of this composition is to offer great stability over time in the ready-for-use state, whatever this may be from the point of view of viscosity, or of that of the quality of the coating obtained from this composition.

This is quite apparent in the results collected in the Table below, these results relating to the change of the pH and of the viscosity as a function of time and of storage temperature.

TABLE

| Storage time | Tests | 4° C. | 20° C. | 50° C. |
|---|---|---|---|---|
| 0 hour | pH | | 4.3–4.4 | |
| | Brookfield viscosity | | 105 cps | |
| | Ford cup n° 4 | | 27 sec. | |
| 3 days | pH | 4.35 | 4.40 | 4.55 |
| | Brookfield viscosity | 300 cps | 122.5 cps | 110 cps |
| | Ford cup n° 4 | 37 sec. | 29 sec. | 20 sec. |
| 6 days | pH | 4.2 | 4.40 | 4.60 |
| | Brookfield viscosity | 205 cps | 120 cps | 110 cps |
| | Ford cup n° 4 | 37 sec. | 28 sec. | 20 sec. |
| 14 days | pH | 4.25 | 4.40 | 4.60 |
| | Brookfield viscosity | 205 cps | 120 cps | 110 cps |
| | Ford cup n° 4 | 38 sec. | 30 sec. | 20 sec. |

It is observed that at the end of two week's storage at room temperature or even at 4° or 50° C., there is no variation in viscosity.

As a result of which and whatever the embodiment adopted, there is thus provided a composition for the production of a temporary protective coating on articles which have to be stored which has, with respect to those existing hitherto, numerous advantages, notably:
that of being biodegradable,
that of not requiring solvents,
that of being easily removed.

We claim:

1. Process for forming on an article a temporary protective coating comprising the successive steps of applying an aqueous solution comprising at least one solubilized starch or starch derivative and at least one wetting agent, the solubilized starch being a starch selected from the group consisting of starches from any source, natural or hybrid, comprising potatoes, manioc, corn, waxy corn, corn with a high amylose content, wheat, rice, the solubilized starch derivative being selected from the group consisting of starches, except dextrins, modified physically by gelatinization, by cooking-extrusion or heat-extrusion treatments and/or chemically, by oxidation, enzymatic or acid hydrolysis, alkalinization, esterifiction and etherification and of evaporation the water by natural or forced drying.

2. Process according to claim 1, wherein the aqueous solution comprises a wetting agent selected from the froup consisting of anionic, cationic, non-ionic or amphoteric surfactant products.

3. Process according to claim 1, wherein the aqueous solution includes a plasticizing agent.

4. Process according to claim 3, wherein the plasticizing agent is selected from the group consisting of sorbitol, glycerine, hydrogenated glucose syrups, lactates, gluconates, polyethylene and polypropylene glycols and their condensates, urea, thioureas, nitrates and their mixtures.

5. Process according to claim 1, wherein the aqueous solution includes an agent for conferring water resistant properties to the final coating.

6. Process according to claim 5, wherein the agent is selected from the group consisting of ketone-formol, urea-formol, urea-ketone-formol, melamine-formol and cynamide type resins, salts of cyanamide-formol, resorcinol-formol and phenol-formaldehyde resins, glyoxal and aluminum sulfates.

7. Process according to claim 1, wherein the aqueous solution includes a water-repellent agent.

8. Process according to claim 1, wherein the aqueous solution comprises a proportion of from 0.1 to 49, by weight of a synthetic binder selected from the group comprising the latexes, the acrylic resins in solution or in emulsion, the polyvinyl acetates and the vinyl resins.

9. Process according to claim 1, wherein the starch derivative is selected from the group consisting of chemically-modified starches and waxy starches.

10. Process according to claim 9, wherein the waxy starch is modified by a cooking-extrusion treatment.

11. Process according to claim 1, wherein the aqueous solution comprises, with respect to the dry matter content:
a proportion of wetting agent from 0.05 to 10% by weight;
a proportion of plasticizing agent from 0.5 to 30% by weight;
a proportion of insolubilizing agent from 1 to 40% by weight;
a proportion of water-repellent agent from 0.1 to 10% by weight.

12. Process according to claim 1, wherein the aqueous solution comprises, with respect to dry matter and expressed as percentages by weight,
from 30 to 95% of extruded waxy starch,
from 0.5 to 5% of a wetting agent constituted by a non-ionic surface active agent,
from 1 to 25% of a plasticizing agent constituted by sorbitol, glycerin or a polyethyleneglycol,
from 2 to 30% of an insolubilizing agent, constituted by resorcinol-formol or cyanamide-formol,
from 0.2 to 6% of a water-repellent agent constituted by potassium siliconate.

* * * * *